transmission are effectively resisted by parts which are best constructed to withstand them.

For fourth speed or direct drive the sliding clutch hub 115 is shifted forwardly on the splines 99 until the teeth 116 engage the teeth 120 on the driving gear 20. When so engaged the driven shaft 60 is connected directly with the driving shaft 17. For reverse, the gear 128 is shifted rearwardly until the teeth thereof engage the outer or reverse pinions 135 in the usual manner.

Due to the spaces 90 around the splined portion 62 and the one or more openings 94 the bearing of the floating gear 85 on the driven shaft 60 is adequately lubricated.

While I have shown and described in detail the preferred structural embodiment of the present invention it is to be understood that the principles of my invention can be employed in means which is widely different from that shown in the drawings.

What I claim, therefore, and desire to secure by Letters Patent is:

1. In a transmission comprising a housing, and a driven shaft journaled therein, said driven shaft having a splined end and abutment means thereon, a gear mounted on the splined portion and having a flange received against said abutment means, a bushing on the said splined portion and engaging the flange of said gear, said bushing providing a journal support for the gear, and means securing the bushing in place on the driven shaft.

2. In a transmission comprising a driving shaft, a driven shaft, a countershaft, and gear means connecting the driving shaft and a countershaft, the driven shaft having a splined reduced portion and an abutment shoulder between the splined portion and the portion of larger diameter, a bushing carried in said splined portion adjacent the shoulder, gear means connecting the driven shaft and the countershaft and including a gear journaled on said bushing, and locking means for holding said gear in position on the bushing and against said shoulder.

3. In a transmission comprising a driving shaft, a driven shaft, a countershaft, and gear means connecting the driving shaft and the countershaft, the driven shaft having a splined reduced portion and an abutment shoulder between the splined portion and the portion of larger diameter, a bushing carried by said splined portion adjacent the shoulder, gear means connecting the driven shaft and the countershaft and including a gear having an internal groove journaled on said bushing, and ports formed in the bushing to provide communication between the space between the splines on said reduced driven shaft portion and the internal groove in said gear for lubricating said gear and bushing.

4. In a transmission including a housing, and a driven shaft journaled therein and having one portion of larger diameter than the other, there being a shoulder therebetween, a gear adapted to be mounted on said shaft and having an inwardly extending radial flange, bearing means adapted to be slipped onto the driven shaft and receive the gear and to contact with the flange to hold it against said shoulder, and means to hold the bearing means in position on the shaft whereby the gear is journaled for free rotation on the shaft but prevented from moving axially thereof.

5. In a transmission including a housing, and a driven shaft journaled therein and having one portion of larger diameter than the other, there being a shoulder therebetween and the portion of smaller diameter being splined, a gear adapted to be mounted on said shaft and having an inwardly extending radial flange, bearing means adapted to be slipped onto the splined portion of the driven shaft and receive the gear and to contact with the flange to hold it against said shoulder, the bearing means comprising a bushing having interior splines cooperating with the splined portion of the driven shaft, the splines of the bushing being interrupted and the bushing being apertured to provide for lubricating the gear and bushing, means to hold the bushing in position on said shaft, comprising a toothed washer adapted to be mounted on the splined portion of the driven shaft against the bushing, the splines of the shaft being interrupted to permit the washer being turned to bring the teeth thereof in contact with the ends of said splines, and means to retain the washer in position with the teeth behind the splines.

6. In a transmission comprising a housing, and a driven shaft journaled therein, there being abutment means on the driven shaft, a gear mounted on the driven shaft, and means acting as a journal support for the gear for holding the latter against said abutment means whereby axial thrusts of the gear are transmitted to the driven shaft.

7. In a transmission comprising a housing, and a driven shaft journaled therein, said driven shaft having portions of unequal diameter, the smaller portion being splined, abutment means formed between said portions of unequal diameter, a gear mounted on the smaller portion and engaging said abutment means, and means mounted on the smaller splined portion of the driven shaft for rotatably supporting the gear in position against said abutment means.

ROBERT LAPSLEY.

Feb. 26, 1935.  R. H. LAWSON ET AL  1,992,899
KNITTED FABRIC
Original Filed May 14, 1930
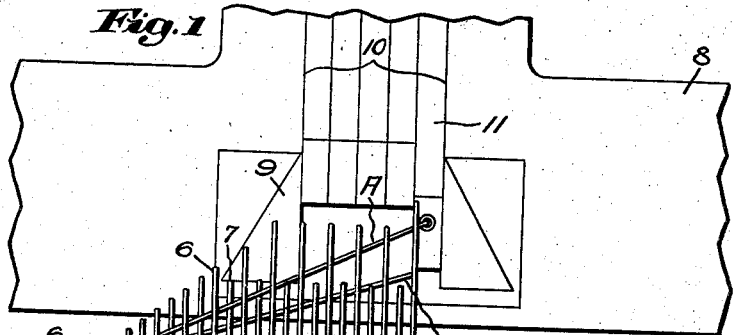
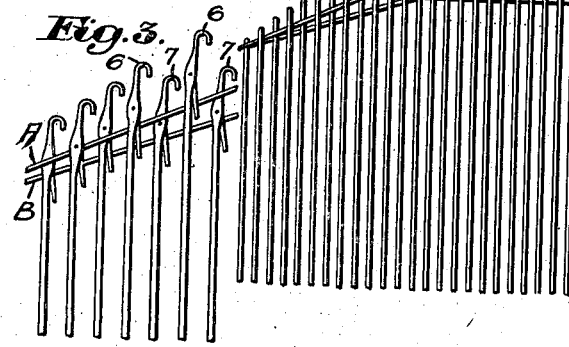
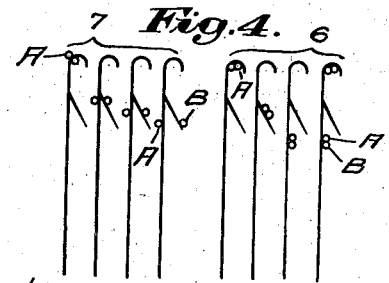
LOW NEEDLES.  HIGH NEEDLES.
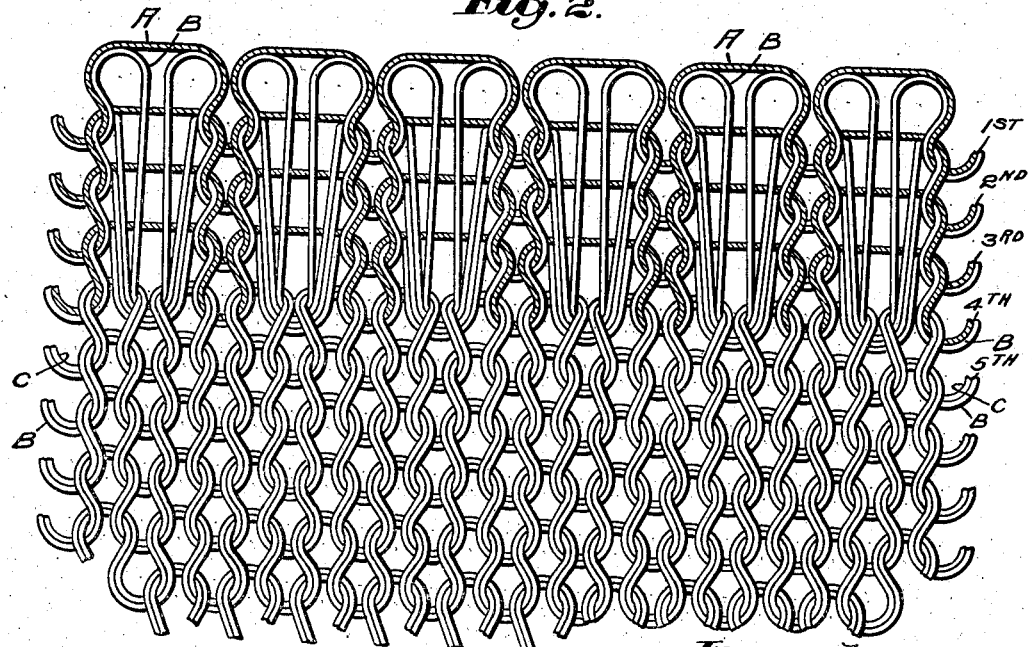
Inventors:
Robert H. Lawson,
Arthur N. Cloutier,
by Emery, Booth, Varney and Townsend Attys.